US011875770B2

(12) United States Patent
Seetharam et al.

(10) Patent No.: US 11,875,770 B2
(45) Date of Patent: Jan. 16, 2024

(54) SYSTEMS AND METHODS FOR SELECTIVELY PROVIDING AUDIO ALERTS

(71) Applicant: ROVI GUIDES, INC., San Jose, CA (US)

(72) Inventors: Madhusudhan Seetharam, Karnataka (IN); Vikram Makam Gupta, Karnataka (IN); Sahir Nasir, San Jose, CA (US)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 17/878,295

(22) Filed: Aug. 1, 2022

(65) Prior Publication Data

US 2023/0054597 A1 Feb. 23, 2023

Related U.S. Application Data

(63) Continuation of application No. 17/252,780, filed as application No. PCT/US2018/058007 on Oct. 29, 2018, now Pat. No. 11,437,010.

(51) Int. Cl.

| | |
|---|---|
| ***G10K 11/178*** | (2006.01) |
| ***H04R 5/04*** | (2006.01) |
| ***H04S 7/00*** | (2006.01) |

(52) U.S. Cl.

CPC .. *G10K 11/17837* (2018.01); *G10K 11/17823* (2018.01); *G10K 11/17827* (2018.01); *G10K 11/17883* (2018.01); *H04R 5/04* (2013.01); *H04S 7/40* (2013.01); *G10K 2210/1081* (2013.01)

(58) Field of Classification Search

None

See application file for complete search history.

(56) References Cited

U.S. PATENT DOCUMENTS

| | | | |
|---|---|---|---|
| 2002/0141599 A1 | 10/2002 | Trajkovic et al. | |
| 2012/0288110 A1* | 11/2012 | Cherkassky | G10K 11/17823 381/71.4 |
| 2015/0195641 A1 | 7/2015 | Di Censo et al. | |
| 2015/0373467 A1* | 12/2015 | Gelter | H04R 29/00 381/56 |
| 2018/0077483 A1 | 3/2018 | Sahay | |
| 2019/0215610 A1 | 7/2019 | Pate et al. | |
| 2019/0378491 A1 | 12/2019 | Mohammad et al. | |
| 2021/0256952 A1 | 8/2021 | Seetharam et al. | |

FOREIGN PATENT DOCUMENTS

WO 2016105620 A1 6/2016

* cited by examiner

*Primary Examiner* — Kenny H Truong

(74) *Attorney, Agent, or Firm* — HALEY GUILIANO LLP

(57) ABSTRACT

Systems and methods for selectively providing audio alerts via a speaker device are disclosed herein. A system plays first audio content through a speaker. A microphone captures second audio content comprising an alert. Output of the second audio content through the speaker is suppressed by using noise cancellation. The system identifies the alert within the second audio content and determines a priority level of the alert. The system determines, based on the priority level, that the alert should be reproduced, and audibly reproduces the alert via the speaker, with the first audio content or instead of the first audio content.

18 Claims, 8 Drawing Sheets

SYSTEMS AND METHODS FOR SELECTIVELY PROVIDING AUDIO ALERTS

CROSS-REFERENCE TO RELATED APPLICATIONS

This application is a continuation of U.S. patent application Ser. No. 17/252,780, Dec. 16, 2020, which is a national stage application under 35 U.S.C. § 371 of International Application PCT/US2018/058007, filed Oct. 29, 2018, which is hereby incorporated by reference herein in its entirety.

BACKGROUND

The present disclosure relates to systems for noise-cancelling speaker devices, and more particularly to systems and related processes for selectively providing an audio alert via a speaker device based on a priority level.

SUMMARY

Noise-cancelling speakers or headphones are effective in reducing unwanted ambient sounds, for instance, by using active noise control. However, in some circumstances it may be desirable to permit a user of noise-cancelling speakers or headphones to hear certain ambient sounds, such as nearby car horns, sirens, or other alerts that may be relevant to the user. Certain technical challenges must be overcome to provide such selective noise cancellation and alert provision. One technical challenge, for example, entails distinguishing between different types of ambient sounds, such as noise that is to be cancelled, alerts that are irrelevant to the user and should also be cancelled, and alerts that are relevant to the user and should be audibly provided. Another technical challenge involves audibly providing relevant alerts to the user in a manner that is effective yet minimally intrusive with respect to music, a podcast, or other audio content to which the user is listening via the noise-cancelling speaker.

In view of the foregoing, the present disclosure provides systems and related processes that identify types of ambient sounds, assign priority levels to the sounds, and, based on the priority levels, cancel undesirable sounds and audibly provide useful sounds or alerts via a speaker. In some aspects, depending upon the audio content being played via the speaker and/or the priority level of an alert, the alert may be time-shifted to be audibly provided in a manner that minimizes interference with the audio content. In this manner, the systems and processes of the present disclosure strike an optimal balance between providing effective noise cancellation and audibly providing relevant alerts despite the noise cancellation.

In one example, the present disclosure provides an illustrative method for selectively providing audio alerts via a speaker device. The speaker device, for instance, may include a speaker and a microphone. While the speaker plays music or another type of audio content within a listening audio environment, the microphone captures noise and any alert that may be present in a surrounding audio environment, which may be external to and/or acoustically isolated from the listening audio environment. The device uses noise cancellation to suppress output of the noise and, at least initially, the alert through the speaker. The device identifies the alert, for example, based on audio fingerprint(s). For instance, the device may store alert audio fingerprints in an alert profile database, generate an audio fingerprint based on the captured noise and alert, and identify the alert by matching the generated audio fingerprint to one of the stored alert audio fingerprints. Once the alert is identified, the device determines a priority level for the alert, for example, based on one or more obtained prioritization factors as described below. If the device determines, based on the priority level, that the alert should be reproduced, the device audibly reproduces the alert via the speaker, along with the music or instead of the music.

As mentioned above, in some aspects, the device may determine the priority level based on one or more prioritization factors. The prioritization factors may include, for instance, a type of the alert, such as a vocal alert or a non-vocal alert. For vocal alerts, the prioritization factor may additionally or alternatively include a vocal characteristic of the alert, such as a loudness of the vocal alert. As another example, the prioritization factor may include a location, speed, or motional direction of a source of the alert (e.g., a siren, a human voice, a doorbell, an alarm, a car horn, and/or the like) and/or of the speaker device itself. The location, speed, and/or motional direction of the speaker device itself, in some cases, may be obtained based on a geo-location subsystem (e.g., a GPS subsystem), a gyroscope, and/or an accelerometer that may be included within the speaker device. The location, speed, and/or motional direction of the alert source may be obtained based on an array of microphones that capture the noise and alert from different perspectives. For instance, based on the noise and/or alert captured via the microphone array, the device may generate a multi-dimensional map and identify the location, speed, and/or motional direction of the alert source based on the map.

The device may, in some cases, determine a distance between the alert source and the speaker device, based on the obtained alert source location and the speaker device location, and determine the priority level based on the distance. For example, if the alert source is located near the device, the device may determine that the alert has a higher priority than if the alert source were located far away from the device. The device may additionally or alternatively compare the direction in which the alert source is moving to the direction in which the speaker device is moving and determine the priority level based on a relationship between the two directions. For instance, if the alert source is on a collision path with the speaker device, the alert may have a higher priority than if the alert source were not on a collision path with the speaker device.

As another example, if the device determines that the alert should be audibly reproduced, the device may determine a time shift or delay according to which the alert should be audibly reproduced to minimize interference between the alert and the music. The device may achieve this functionality, for instance, by storing audio fingerprints of media assets (e.g., songs) in a content database, and determining the time shift by: capturing a sample of the music (or other content) being played through the speaker, generating an audio fingerprint for the captured sample; matching the generated audio fingerprint to a stored audio fingerprint to identify the song being played; identifying an upcoming quiet portion of the song; and selecting the time shift that aligns the audible reproduction of the alert with the upcoming quiet portion of the song.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
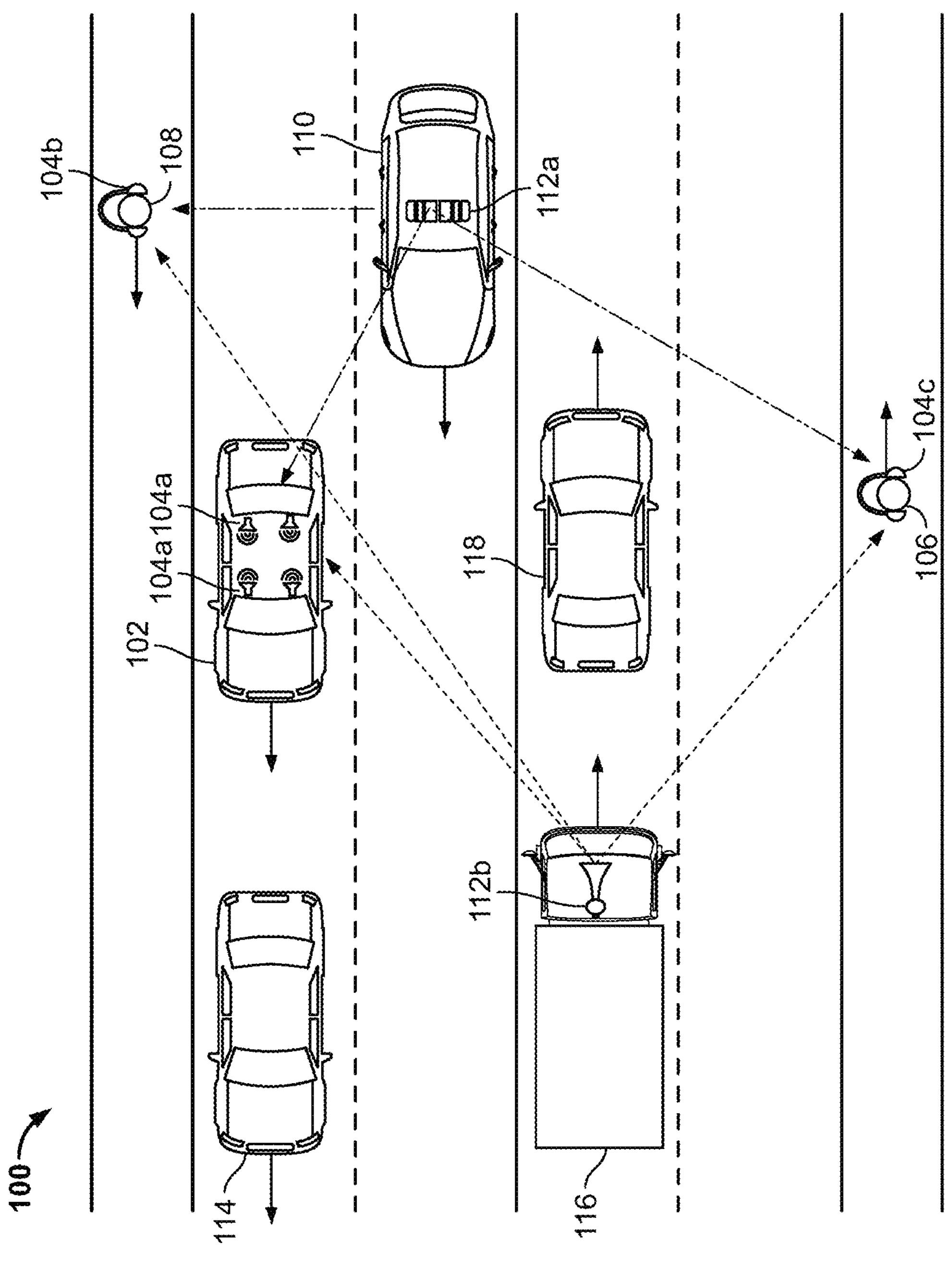
FIG. 1 shows an illustrative scenario in which speaker devices may selectively provide audio alerts, in accordance with some embodiments of the present disclosure.

FIG. 1 shows an illustrative scenario 100 in which various types of speaker devices may selectively provide audio alerts, in accordance with some embodiments of the present disclosure. In particular, scenario 100 shows automobile 102 traveling along a roadway and pedestrian 108 and cyclist 106 traveling along respective paths adjacent the roadway. Automobiles 114 and 118, truck 116, and police car 110 are also traveling in respective directions along respective paths of the roadway and introduce various sounds into their environment. Some of those sounds, such as noise, may be deemed undesirable to hear, and others of those sounds, such as alerts, may be deemed useful to hear. For example, automobiles 114 and 118 may generate road noise (not shown in FIG. 1) from the friction between their tires and the road, and police car 110 and truck 116 may generate alerts by sounding their siren 112*a* and horn 112*b*, respectively. As used herein, the term alert should be understood to mean any type of sound that may be audibly reproduced via speaker device 104.

Each of automobile 102, pedestrian 108, and cyclist 106 has a corresponding noise-cancelling speaker device 104*a*, 104*b*, and 104*c* (collectively, 104) having one or more speakers. For example, automobile 102 may include noise-cancelling speaker device 104*a*, which may be integrated with an audio system of automobile 102, and pedestrian 108 and cyclist 106 are wearing noise-cancelling headphones 104*b* and headphones 104*c*, respectively. Each of speaker devices 104 defines a respective listener audio environment and at least partially acoustically isolates (e.g., via active noise cancellation and/or passive noise isolation) the respective listener environment from the roadway, which represents an external audio environment. In various aspects, each of speaker devices 104 may be configured to suppress output of external audio environment noises (e.g., the road noise generated by automobiles 114 and 118) through its speaker(s) and selectively and audibly provide, through its speaker(s) to its respective listener within the listener audio environment, alerts (e.g., noises from various alert sources, such as siren 112*a* and/or horn 112*b*) from the external audio environment.

In some cases, each speaker device 104 may be configured to distinguish between different types of ambient sounds, such as noise that is to be cancelled, alerts that are irrelevant to its listener and should also be cancelled, and alerts that are relevant to the listener and should be audibly provided. As described in further detail elsewhere herein, speaker devices 104 may additionally be configured to employ time shifts or delays to audibly provide relevant alerts to the respective listeners in a manner that is effective yet minimally intrusive with respect to music, a podcast, or other audio content to which the listener may be listening via speaker devices 104.

Figure 2:
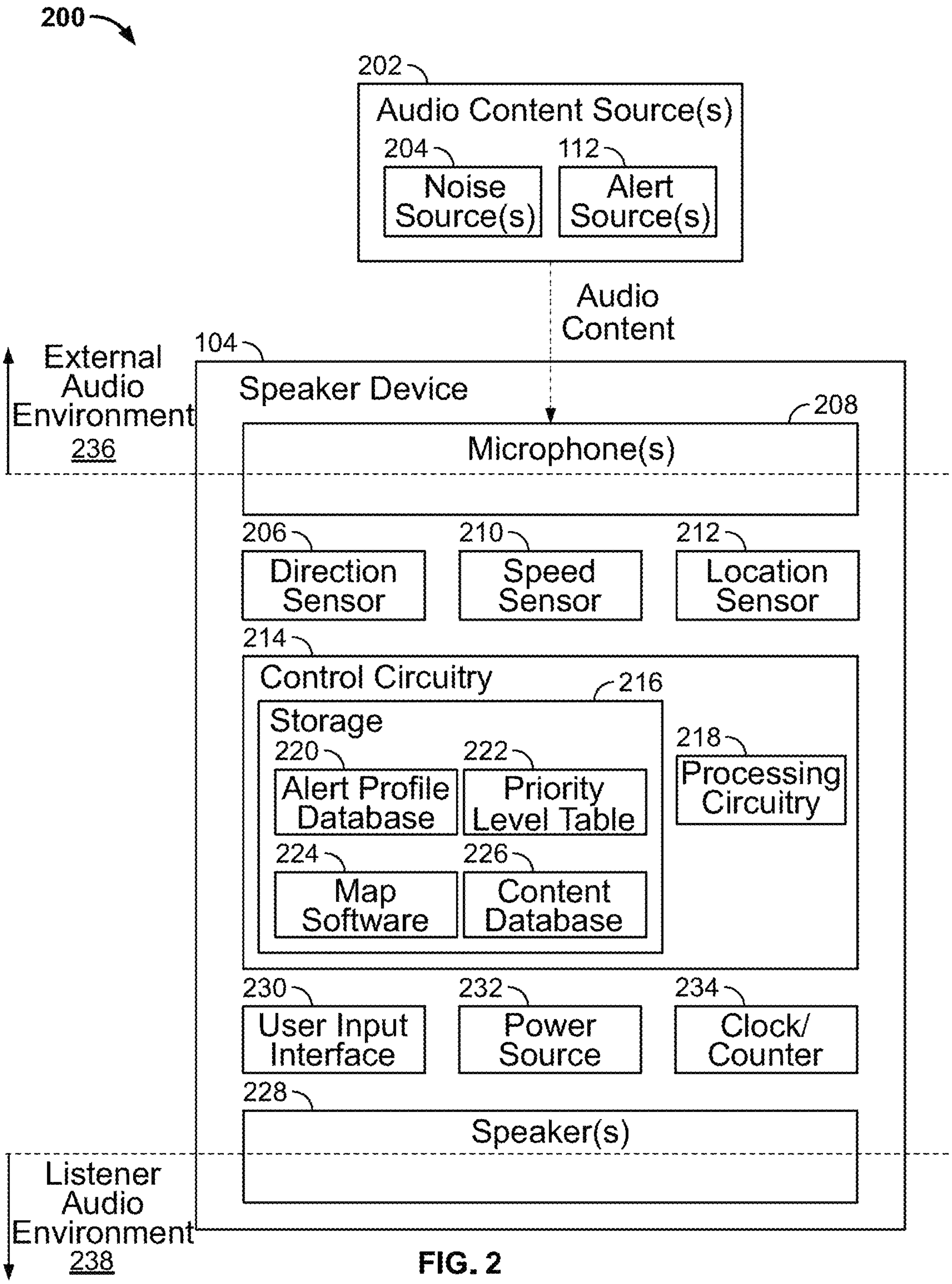
FIG. 2 is an illustrative block diagram of a system for selectively providing audio alerts, in accordance with some embodiments of the disclosure.

FIG. 2 is an illustrative block diagram of system 200 for selectively providing audio alerts, in accordance with some embodiments of the disclosure. System 200 includes noise-cancelling speaker device 104, which is configured to selectively provide audio alerts. In various embodiments, speaker device 104 may take the form of a personal speaker device, such as noise-cancelling headphones 104*b* or 104*c* worn by pedestrian 108 or cyclist 106, respectively (FIG. 1), or an automobile-based speaker device, such as speaker device 104*a* that is integrated with the audio system of automobile 102 (FIG. 1), or a smart speaker device, or any other type of noise-cancelling speaker device that has been configured to selectively provide audio alerts. Speaker device 104 includes one or more microphones 208, direction sensor 206, speed sensor 210, location sensor 212, control circuitry 214, user input interface 230, power source 232, clock/counter 234, and one or more speakers 228.

Speaker device 104 is configured to audibly provide or play back, via speaker(s) 228, audio content (e.g., music, podcasts, audiobooks, computer audio content, telephone call audio content, and/or the like) within listener audio environment 238. Speaker device 104 is additionally configured to receive, via microphone(s) 208, audio content from one or more audio content sources 202 in external audio environment 236 and distinguish between different types of sounds in the audio content, such as noise (e.g., from noise sources 204, such as the road noise from automobiles 114 and 118 of FIG. 1) that is to be cancelled, alerts that are irrelevant to its listener and should also be cancelled, and alerts that are relevant to the listener and should be audibly provided. In various aspects, speaker device 104 at least partially acoustically isolates listener audio environment 238 from external audio environment 236, for instance, by including passive sound isolation material (e.g., around-the-ear padding, soundproofing and/or sound-deadening material, and/or the like) and/or using active noise cancellation.

Power source 232 is configured to provide power to any power-consuming components of speaker device 104 to facilitate their respective functionality. In some aspects, speaker device 104 may be self-powered, in which case power source 232, such as a rechargeable battery, may be included as a component of speaker device 104. Alternatively or additionally, speaker device 104 may receive power from an external power source, in which case the external power source (not depicted in FIG. 2), such as an electrical grid, an automobile power source, and/or the like, may be coupled to speaker device 104.

Direction sensor 206, speed sensor 210, and/or location sensor 212 are configured to sense a direction of motion, a speed, and/or a location, respectively, of speaker device 104, for use in selectively providing audio alerts, as described elsewhere herein. Direction sensor 206, speed sensor 210, and/or location sensor 212 may include a geo-location subsystem (e.g., a GPS subsystem), a gyroscope, an accelerometer, and/or any other type of direction, speed, or location sensor.

Speaker device 104, in some aspects, may determine a time shift or delay according to which an alert should be audibly reproduced to minimize interference between the alert and any music, podcast, or other audio content to which the listener may be listening via speaker devices 104. In such examples, clock/counter 234 may be used as a time reference for delaying audio alert playback, and/or may otherwise provide speaker device 104 with time information that is utilized in accordance with procedures herein.

Control circuitry 214 includes processing circuitry 218 and storage 216. In various embodiments, alert profile database 220, priority level table 222, map software 224, and/or content database 226 (each described below) may be stored in storage 216. Alert profile database 220 stores alert profiles (e.g., profiles and/or audio fingerprints of alert sounds, such as car horn sounds, siren sounds, vocal sounds, and/or the like) that control circuitry 214 uses to identify alerts in external audio content. Additional aspects of the components of computing device 202 and server 204 are described below. Control circuitry 214 may be based on any suitable processing circuitry such as processing circuitry 218. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors, for example, multiple of the same type of processors (e.g., two Intel Core i9 processors) or multiple different processors (e.g., an Intel Core i7 processor and an Intel Core i9 processor). In some embodiments, control circuitry 214 executes instructions for an application stored in memory (e.g., storage 216). Specifically, control circuitry 214 may be instructed by the application to perform the functions discussed above and below. For example, the application may provide instructions to control circuitry 214 to audibly reproduce audio alerts. In some implementations, any action performed by control circuitry 214 may be based on instructions received from the application. The application may be, for example, a stand-alone application implemented on speaker device 104. For example, the application may be implemented as software or a set of executable instructions that may be stored in storage 216 and executed by control circuitry 214. In some embodiments, the application may be a client/server application where only a client application resides on speaker device 104, and a server application resides on a remote server (not shown in FIG. 2).

The application may be implemented using any suitable architecture. For example, it may be a stand-alone application wholly implemented on speaker device 104. In such an approach, instructions of the application are stored locally (e.g., in storage 216), and data for use by the application is downloaded on a periodic basis (e.g., from an out-of-band feed, from an Internet resource, or using another suitable approach) Control circuitry 214 may retrieve instructions of the application from storage 216 and process the instructions to generate any of the audio alerts discussed herein. Based on the processed instructions, control circuitry 214 may determine what action to perform when input is received from user input interface 230. For example, when user input interface 230 indicates that a mute button was selected, the processed instructions may cause audio alerts to be muted.

In client/server-based embodiments, control circuitry 214 may include communications circuitry suitable for communicating with an application server or other networks or servers. The instructions for carrying out the functionality described herein may be stored on the application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths. In addition, communications circuitry may include circuitry that enables peer-to-peer communication of computing devices, or communication of computing devices in locations remote from each other. In some embodiments, speaker device 104 may operate in a cloud computing environment to access cloud services. In a cloud computing environment, various types of computing services for content sharing, storage or distribution (e.g., video sharing sites or social networking sites) are provided by a collection of network-accessible computing and storage resources (e.g., a combination of servers and/or cloud storage), referred to as "the cloud." For example, the cloud can include a collection of server computing devices, which may be located centrally or at distributed locations, that provide cloud-based services to various types of users and devices connected via a network such as the Internet via a communications network (not shown in FIG. 2). These cloud resources may include alert profile database 220, priority level table 222, map software 224, content database 226, and/or other types of databases, which store data that is utilized in accordance with the procedures herein. In some aspects, alert profile database 220, priority level table 222, map software 224, and/or content database 226 may be periodically updated based on more up-to-date versions of alert profile database 220, priority level table 222, map software 224, and/or content database 226 that may be stored within the cloud resources. In addition or in the alternative, the remote computing sites may include other computing devices. For example, the other computing devices may provide access to stored copies of audio content or streamed audio content. In such embodiments, computing devices may operate in a peer-to-peer manner without communicating with a central server. The cloud provides access to services, such as content storage, content sharing, or social networking services, among other examples, as well as access to any content described above, for computing devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a computing device to store content to the cloud and to receive content from the cloud rather than storing content locally and accessing locally stored content.

Control circuitry 214 may include audio-generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 214 may also include scaler circuitry for upconverting and downconverting content into the preferred output format of the speaker device 104. Control circuitry 214 may also include digital-to-analog converter circuitry and analog-to-digital converter circuitry for converting between digital and analog signals. The tuning and encoding circuitry may be used by the computing device to receive and to play or to record content. The circuitry described herein, including, for example, the tuning, video-generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 216 is provided as a separate device from speaker device 104, the tuning and encoding circuitry (including multiple tuners) may be associated with storage 216.

A user may send instructions to control circuitry 214 using user input interface 230. User input interface 230 may be any suitable user interface, such as a remote control, trackball, keypad, keyboard, touch screen, touchpad, stylus input, joystick, voice recognition interface, or other user input interfaces. User input interface 230 may be integrated with or combined with a display (not shown in FIG. 2), which may be a monitor, a television, a liquid crystal display (LCD) for a mobile device or automobile, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images.

Figure 3:
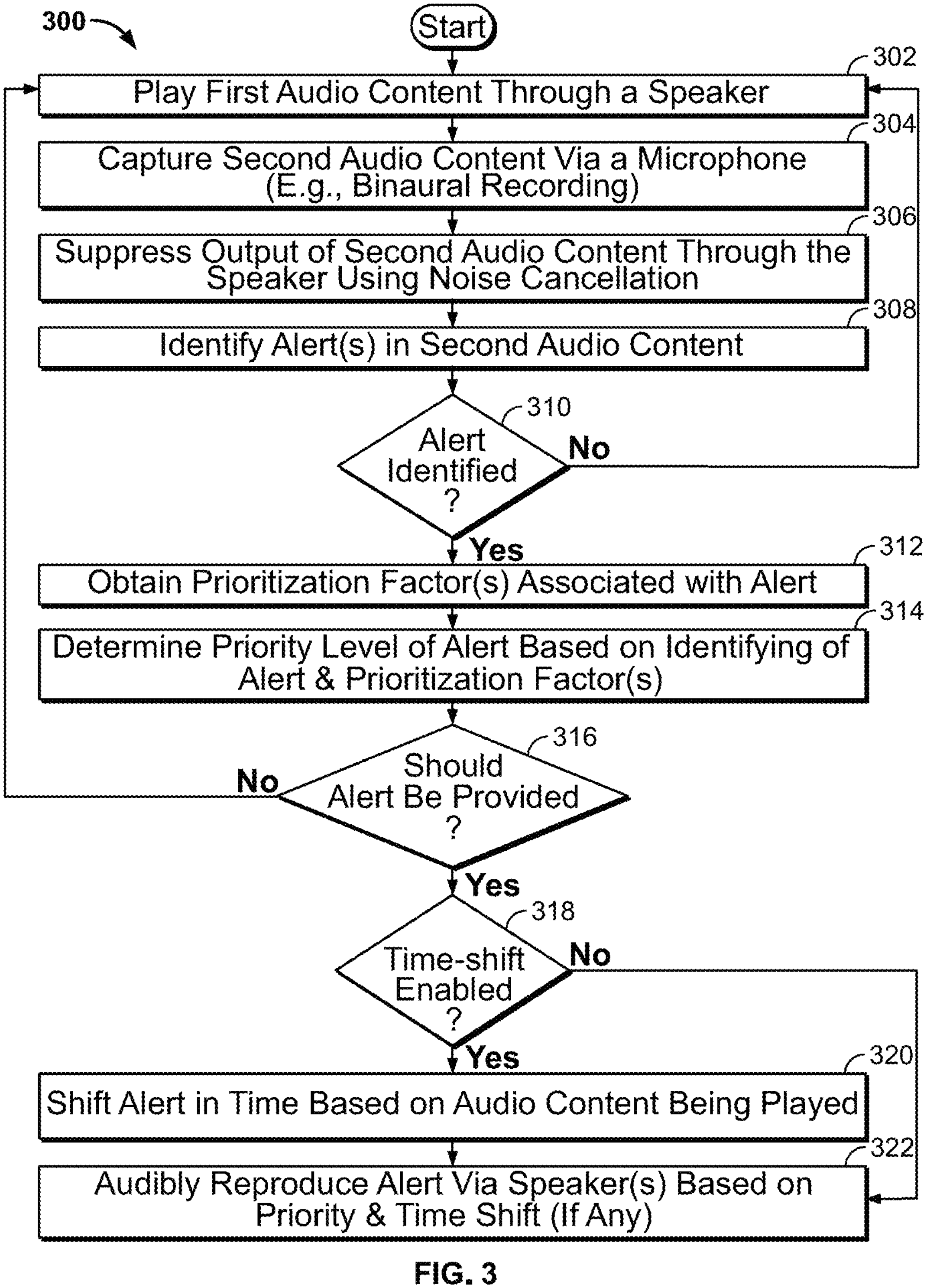
FIG. 3 depicts an illustrative flowchart of a process for selectively providing audio alerts, in accordance with some embodiments of the disclosure.

FIG. 3 depicts an illustrative flowchart of process 300 for selectively providing audio alerts, in accordance with some embodiments of the disclosure. At block 302, control circuitry 214 plays audio content, such as music, a podcast, an audiobook, and/or the like, through the speaker 228 into the listener audio environment 238. At block 304, control circuitry 214 captures, via microphone 208, external audio content from audio content sources 202 (e.g., noise sources 204, alert sources 112) in the external audio environment 236. At block 306, control circuitry 214 suppresses output of the external audio content through speaker 228 by using noise cancellation. At block 308, control circuitry 214 processes the external audio content to identify any alerts (e.g., from alert sources 112) that may be included in the external audio content, as described in further detail in connection with FIG. 4. If control circuitry 214 identifies an alert within the external audio content ("Yes" at block 310), then control passes to block 312. If control circuitry 214 does not identify an alert within the external audio content ("No" at block 310), then control passes to back to block 302 to continue to play back the music or other audio content through the speaker 228.

At block 312, control circuitry 214 obtains one or more prioritization factors associated with the alert identified at block 308, for use in determining a priority level for the alert. Additional details about how control circuitry 214 may obtain prioritization factors at block 312 are described below in connection with FIG. 5. At block 314, control circuitry 214 determines a priority level for the alert based on the prioritization factor(s) obtained at block 312. Additional details about how control circuitry 214 may determine priority levels for alerts at block 314 are described below in connection with FIG. 6.

At block 316, control circuitry 214 determines, based on the priority level for the alert determined at block 314, whether the alert should remain suppressed or be audibly provided. For example, if the alert is irrelevant to the user and has been assigned a low priority, the alert may remain suppressed. If the alert is relevant to the user and has been assigned a medium or high priority, control circuitry 214 may determine that the alert should be audibly reproduced. If control circuitry 214 determines that the alert should not be audibly provided ("No" at block 316), then control passes back to block 302 to continue to play back the music or other audio content through the speaker 228. If, on the other hand, control circuitry 214 determines that the alert should be audibly provided ("Yes" at block 316), then control passes to block 318.

At block 318, control circuitry 214 determines whether any time shift is enabled for the audible reproduction of the alert. If control circuitry 214 determines that no time shift is enabled for the audible reproduction of the alert ("No" at block 318), then control passes to block 322. If control circuitry 214 determines that a time shift is enabled for the audible reproduction of the alert ("Yes" at block 318), then control passes to block 320, at which control circuitry 214 shifts the alert in time based on the particular music or other audio content being played through the speaker 228. Details about how control circuitry 214 may determine a time shift to be utilized at block 320 are provided below in connection with FIG. 7. At block 322, control circuitry 214 audibly reproduces the alert via speaker 228 with a time shift (if control was passed to block 322 by way of block 320) or with no time shift (if control was passed to block 322 directly from block 318). Details about how control circuitry 214 may audibly reproduce the alert at block 322 are described below in connection with FIG. 8.

Figure 4:
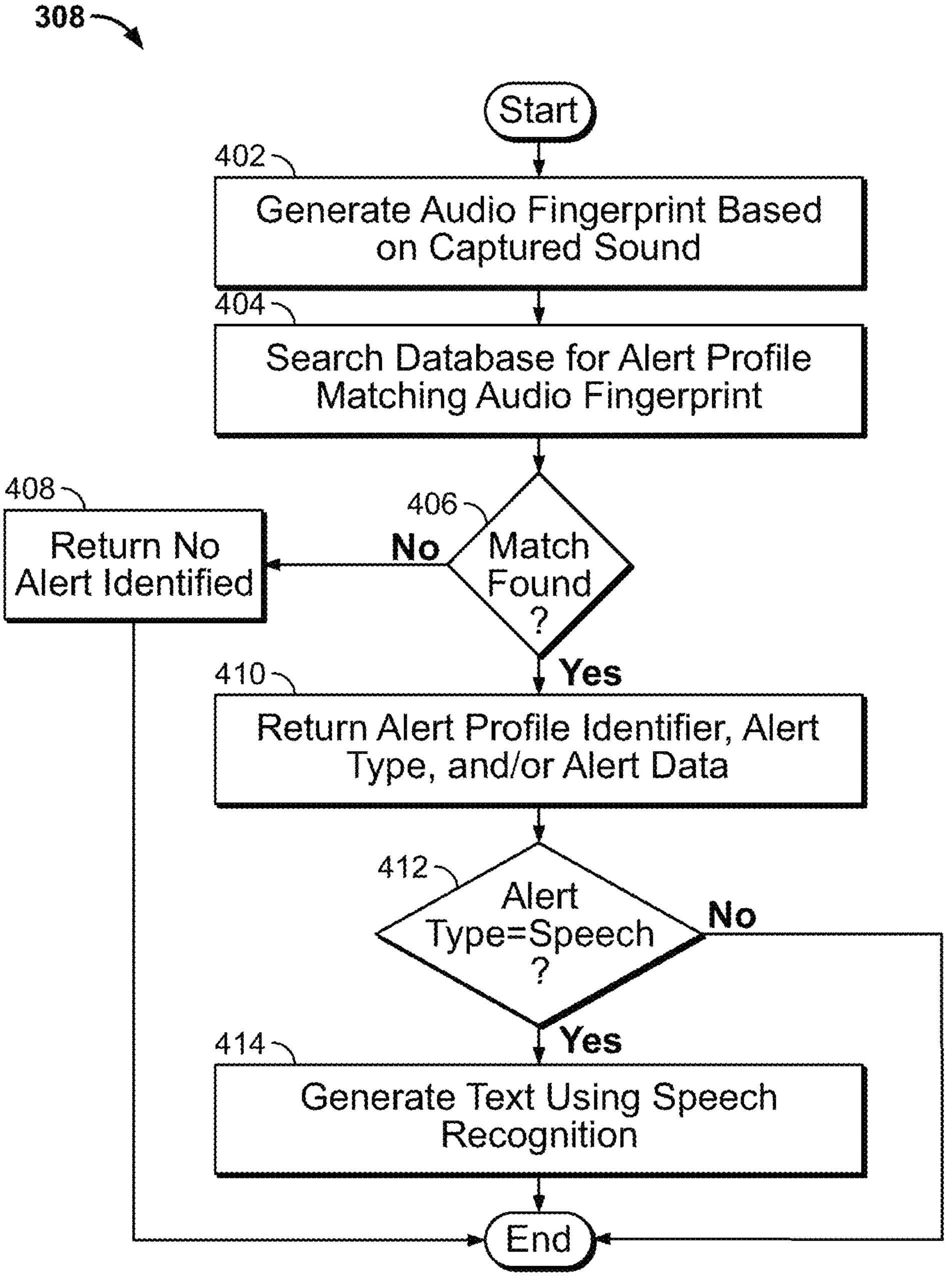
FIG. 4 shows a flowchart of an example process for identifying alerts, in accordance with some embodiments of the disclosure.

FIG. 4 shows a flowchart illustrating how control circuitry 214 may process, at block 308 of FIG. 3, external audio content to identify any alerts (e.g., from alert sources 112) that may be included in the external audio content, in accordance with some embodiments of the present disclosure. At block 402, control circuitry 214 generates an audio fingerprint in a known manner based on the external audio content captured by the microphone 208 from external audio content sources 202. The external audio content captured by microphone 208, in various circumstances, may include more than one distinct sound component. For example, the external audio content may include a noise component from noise source 204 and an alert component from alert source 112. In such circumstances, at block 402 control circuitry 214 may isolate and/or extract the sound components from the external audio content and generate a separate audio fingerprint for each sound component. For example, control circuitry 214 may isolate and/or extract the noise component and the alert component from the external audio content and then generate one audio fingerprint for the noise component and another audio fingerprint for the alert component. Control circuitry 214 may isolate or extract the sound components of the captured external audio content in a variety of ways. For instance, control circuitry 214 may first generate a frequency-domain representation of the captured external audio content by applying a Fast Fourier Transform (FFT), a wavelet transform, or another type of transform to the captured external audio content. Control circuitry 214 may then isolate or extract the sound components from the frequency-domain representation of the captured external audio content based on frequency range. For example, the noise component may lie within one frequency range and the alert component may lie within another frequency range, in which case control circuitry 214 may isolate or extract the noise component and alert component by applying frequency-based filtering to the captured external audio content. In some embodiments, control circuitry 214 may also apply to the output of the FFT or wavelet transform one or more machine learning techniques based on parameters such as isolated sound, sound duration, amplitude, location, and/or the like to improve the accuracy of sound component isolation, extraction, and identification. Once control circuitry 214 has isolated or extracted the sound components from the external audio content, control circuitry 214 may generate a separate audio fingerprint for each sound component using known techniques.

At block 404, control circuitry 214 searches alert profile database 220 for an alert profile (e.g., an audio fingerprint of an alert sound, alert profile identifier, an alert type, and/or other alert data) that matches the audio fingerprint generated at block 402. In embodiments where control circuitry 214 generates, at block 402, multiple audio fingerprints for multiple sound components, respectively, of the captured external audio content, control circuitry 214 may conduct a separate search at block 404 for each generated audio fingerprint. In various aspects, alert profile database 220 may store various types of alert profiles, such as siren profiles, alarm profiles, horn profiles, speech profiles (e.g., the calling of a listener's name), and/or the like to enable detection and audible reproduction of those alerts. As one of skill in the art would appreciate, the types of alerts that the systems and related processes of the present disclosure can detect and audibly reproduce are configurable and limitless. If control circuitry 214 does not find any alert profile in alert profile database 220 that matches the audio fingerprint generated at block 402 for the external audio content ("No" at block 406), then control passes to block 408, at which control circuitry 214 returns a result indicating that no alert has been identified in the external audio content. If, on the other hand, control circuitry 214 finds an alert profile in alert profile database 220 that matches the audio fingerprint generated at block 402 for the external audio content ("Yes" at block 406), then control passes to block 410.

At block 410, control circuitry 214 returns an alert profile identifier, an alert type, and/or other alert data that is stored in alert profile database 220 in the matched alert profile. At block 412, control circuitry 214 determines whether the alert type for the matched alert profile is speech. If control circuitry 214 determines that the alert type for the matched alert profile is speech ("Yes" at block 412), then control passes to block 414, at which control circuitry 214 uses speech recognition processing to generate a text string based on the captured speech content and stores and/or returns the text string. If, on the other hand, control circuitry 214 determines that the alert type for the matched alert profile is not speech ("No" at block 412), then process 308 is completed.

Figure 5:
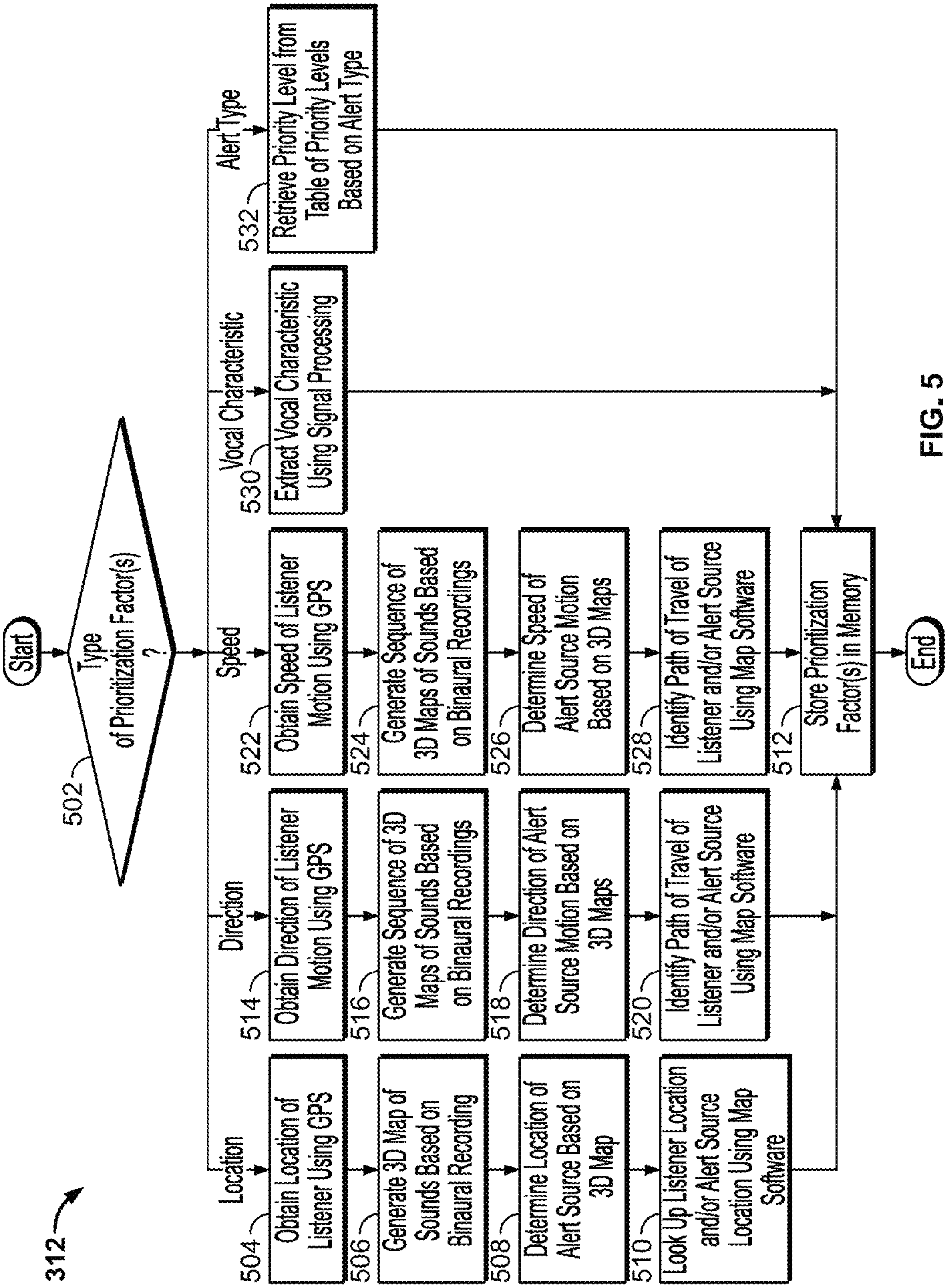
FIG. 5 is an illustrative flowchart of a process for obtaining prioritization factors for alerts, in accordance with some embodiments.

FIG. 5 shows a flowchart demonstrating how control circuitry 214 may obtain, at block 312 of FIG. 3, prioritization factors for alerts, to be used as a basis upon which control circuitry 214 may determine a priority level for an alert, in accordance with some embodiments herein. Control circuitry 214 may be configured (e.g., automatically and/or through a user-configurable setting on speaker device 104) to obtain any one or any combination of a variety of types of prioritization factors, such as location-based prioritization factors, direction-based prioritization factors, speed-based prioritization factors, vocal characteristic-based prioritization factors, alert type-based prioritization factors, and/or the like.

From block 502, control passes to certain blocks, depending upon the type of prioritization factor. Although FIG. 5 shows the different types of prioritization factors being individually executed options, in various embodiments any combination of the shown prioritization factors may be executed in combination. If the location-based prioritization factor is enabled ("Location" at block 502), then control passes to block 504. If the direction-based prioritization factor is enabled ("Direction" at block 502), then control passes to block 514. If the speed-based prioritization factor is enabled ("Speed" at block 502), then control passes to block 522. If the vocal characteristic-based prioritization factor is enabled ("Vocal Characteristic" at block 502), then control passes to block 530. If the alert type-based prioritization factor is enabled ("Alert Type" at block 502), then control passes to block 532.

At block 504, control circuitry 214 obtains a location of speaker device 104 (and by inference a location of the listener using the speaker device 104) by using location sensor 212 (e.g., a geo-location subsystem such as a GPS subsystem). In some examples, the speaker device 104 includes an array of microphones 208 that capture the external sound from different perspectives and generate a binaural recording of the captured sound. In such an example, at block 506, control circuitry 214 generates a three-dimensional (3D) map of the captured external sounds based on the binaural recording. At block 508, control circuitry 214 determines a location of the alert source 112 based on the 3D map generated at block 506. For example, control circuitry 214 may search the 3D map to find a sound (and a corresponding location) matching the audio fingerprint of the alert that was generated at block 402 (FIG. 4). In other examples, control circuitry 214 may determine the location of alert source 112 by using radar, lidar, computer vision techniques, Internet of Things (IoT) components or techniques, or other known means that may be included in speaker device 104.

At block 510, control circuitry 214 may look up the location of speaker device 104 and/or of alert source 112 based on map software 224 stored in storage 216. For example, map software 224 may include information regarding roadways, paths, directions of travel, and/or the like, which control circuitry 214 may use as the basis upon which to determine whether an alert is relevant for a listener. As part of block 510, control circuitry 214 may determine, for instance, that speaker device 104 (e.g., device **104*b* worn by pedestrian 108) is located relatively far from alert source 112 (e.g., truck 116). In such an example, control circuitry 214 may determine that the alert from alert source 112*b* (i.e., the truck horn) is not relevant to pedestrian 108 and so should remain suppressed and not be audibly reproduced via speaker 104*b*. From block 510, control passes to block 512, at which control circuitry 214 stores the prioritization factors obtained, determined, and/or generated at blocks 504, 506, 508, and/or 510 for use by control circuitry 214 in determining a priority level for the alert (block 314, FIG. 3 and FIG. 6**).

If control was passed from block 502 to block 514, then control circuitry 214 obtains at block 514 a direction of motion of the speaker device 104 (and by inference a direction of motion of the listener using the speaker device 104) by using direction sensor 206. At block 516, control circuitry 214 generates sequences of three-dimensional (3D)

maps of captured external sounds based on sequences of captured binaural recordings, for example, in a manner similar to that described above in connection with block 506. At block 518, control circuitry 214 determines a direction of motion of alert source 112 based on the sequences of 3D maps generated at block 516, in a manner similar to that described above in connection with block 508. For example, control circuitry 214 may compare respective locations of alert source 112 in sequential 3D maps to ascertain a direction of motion of alert source 112.

At block 520, control circuitry 214 may look up the direction of motion of speaker device 104 and/or of alert source 112 based on map software 224 stored in storage 216. As part of block 510, control circuitry 214 may determine, for instance, that speaker device 104 (e.g., device 104*a* of automobile 102) is traveling westbound on a westbound lane of a roadway and alert source 112 (e.g., truck 116) is traveling eastbound on an eastbound lane of the roadway, where the eastbound and westbound lanes are separated by a rigid divider. In such an example, for instance, because of the divider separating speaker device 104*a* and truck 116, control circuitry 214 may determine that the alert from alert source 112*b* (i.e., the truck horn) is not relevant to the occupant of automobile 102 and so should remain suppressed and not be audibly reproduced via speaker 104*a*. From block 520, control passes to block 512, at which control circuitry 214 stores the prioritization factors obtained, determined, and/or generated at blocks 514, 516, 518, and/or 520 for use by control circuitry 214 in determining a priority level for the alert (block 314, FIG. 3 and FIG. 6).

If control was passed from block 502 to block 522, then control circuitry 214 obtains at block 522 a speed at which speaker device 104 is moving (and by inference a speed at which the listener using speaker device 104 is moving) by using speed sensor 210. At block 524, control circuitry 214 generates sequences of 3D maps of the captured external sounds based on sequentially captured binaural recordings, for example, in a manner similar to that described above in connection with block 506. At block 526, control circuitry 214 determines a speed of alert source 112 based on the sequences of 3D maps generated at block 524, in a manner similar to that described above in connection with block 508. For example, control circuitry 214 may compare respective locations of alert source 112 in sequential 3D maps to ascertain a speed of travel of the alert source 112.

At block 528, control circuitry 214 may look up a path of travel of speaker device 104 (or listener) and/or alert source 112 based on map software 224 stored in storage 216, for example, in a manner similar to that described above in connection with block 520. From block 528, control passes to block 512, at which control circuitry 214 stores the prioritization factors obtained, determined, and/or generated at blocks 522, 524, 526, and/or 528 for use by control circuitry 214 in determining a priority level for the alert (block 314, FIG. 3 and FIG. 6).

If control was passed from block 502 to block 530, then control circuitry 214 extracts at block 530 one or more vocal characteristics of the external audio content (e.g., speech) captured at block 304 (FIG. 3). Example types of vocal characteristics that control circuitry 214 may extract at block 530 may include loudness (e.g., volume), rate, pitch, articulation, pronunciation, fluency, and/or the like. From block 530, control passes to block 512, at which control circuitry 214 stores the prioritization factors (e.g., vocal characteristics) obtained, determined, and/or generated at block 530 for use by control circuitry 214 in determining a priority level for the alert (block 314, FIG. 3 and FIG. 6).

In some examples, the priority level table 222 stored in storage 216 may store a predetermined mapping of alert types to priority levels. For instance, the priority level table 222 may indicate that horns and sirens are automatically assigned high priority. In such an example, if control was passed from block 502 to block 532, then at block 532 control circuitry 214 retrieves from priority level table 222 a priority level for the alert based on the alert type returned at block 410 (FIG. 4). From block 532, control passes to block 512, at which control circuitry 214 stores the priority level retrieved at block 532 for use by control circuitry 214 in determining a priority level for the alert (block 314, FIG. 3 and FIG. 6).

Figure 6:
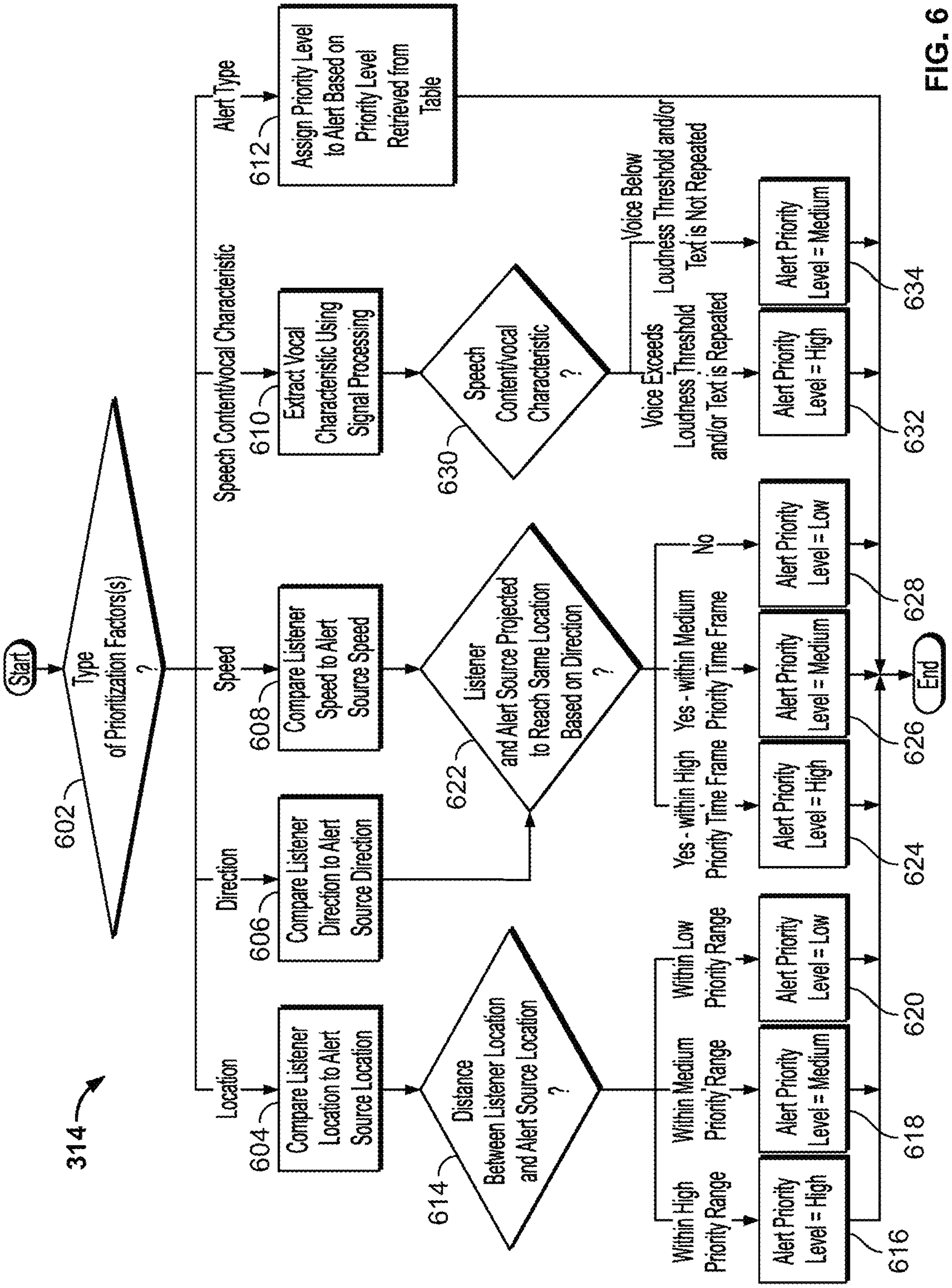
FIG. 6 depicts an illustrative flowchart of a process for determining priority levels for alerts, in accordance with some embodiments of the disclosure.

FIG. 6 shows a flowchart illustrating how control circuitry 214 may determine priority levels for alerts at block 314 (FIG. 3), in accordance with some embodiments of the disclosure. From block 602, control passes to certain blocks, depending upon the type of prioritization factor. Although FIG. 6 shows the different types of prioritization factors being individually executed options, in various embodiments any combination of the shown prioritization factors may be executed in combination. If the location-based prioritization factor is enabled ("Location" at block 602), then control passes to block 604. If the direction-based prioritization factor is enabled ("Direction" at block 602), then control passes to block 606. If the speed-based prioritization factor is enabled ("Speed" at block 602), then control passes to block 608. If the vocal characteristic-based prioritization factor is enabled ("Speech Content/Vocal Characteristic" at block 602), then control passes to block 610. If the alert type-based prioritization factor is enabled ("Alert Type" at block 602), then control passes to block 612.

At block 604, control circuitry 214 compares the location of speaker device 104 (or the location of the listener, e.g., as determined at block 504 of FIG. 5) to the location of alert source 112 (e.g., as determined at block 508 of FIG. 5), to ascertain a distance between speaker device 104 (or listener) and alert source 112. In some examples, control circuitry 214 stores as part of priority level database 222 in storage 216 a predetermined mapping of non-overlapping ranges of distances from speaker device 104 to alert source 112 and corresponding priority levels. For example, control circuitry 214 may store in storage 216 (1) a low priority range of distances (e.g., relatively far distances) that corresponds to a low priority level for alerts from alert sources 112 that fall within the low priority range of distances; (2) a medium priority range of distances that corresponds to a medium priority level for alerts from alert sources 112 that fall within the medium priority range of distances; and (3) a high priority range of distances (e.g., relatively near distances) that corresponds to a high priority level for alerts from alert sources 112 that fall within the high priority range of distances.

If control circuitry 214 determines that the distance between speaker device 104 (or listener) and alert source 112 falls within the high priority range of distances ("Within High Priority Range" at block 614), then control passes to block 616, at which control circuitry 214 sets a high priority level for the alert. If control circuitry 214 determines that the distance between speaker device 104 (or listener) and alert source 112 falls within the medium priority range of distances ("Within Medium Priority Range" at block 614), then control passes to block 618, at which control circuitry 214 sets a medium priority level for the alert. If control circuitry

214 determines that the distance between speaker device 104 (or listener) and alert source 112 falls within the low priority range of distances ("Within Low Priority Range" at block 614), then control passes to block 620, at which control circuitry 214 sets a low priority level for the alert. From block 616, 618, or 620, process 314 terminates.

If control passed from block 602 to block 606, then at block 606, control circuitry 214 compares the direction of movement of speaker device 104 (or the direction of movement of the listener, e.g., as determined at block 514 of FIG. 5) to the direction of movement of alert source 112 (e.g., as determined at block 518 of FIG. 5), to ascertain whether speaker device 104 and alert source 112 are expected to cross paths or become near one another and, if so, in what time frame. In some examples, control circuitry 214 stores as part of the priority level database 222 in storage 216 a predetermined mapping of non-overlapping expected path crossing time frames and corresponding priority levels. For example, control circuitry 214 may store in storage 216 (1) a medium priority time frame (e.g., a relatively long time frame) that corresponds to a medium priority level for alerts; and (2) a high priority time frame (e.g., a relatively short time frame) that corresponds to a high priority level for alerts. If control circuitry 214 determines that the speaker device 104 and alert source 112 are expected to cross paths within a high priority time frame ("Yes—Within High Priority Time Frame" at block 622), then control passes to block 624, at which control circuitry 214 sets a high priority level for the alert. If control circuitry 214 determines that speaker device 104 and alert source 112 are expected to cross paths within a medium priority time frame ("Yes—Within Medium Priority Time Frame" at block 622), then control passes to block 626, at which control circuitry 214 sets a medium priority level for the alert. If control circuitry 214 determines that speaker device 104 and alert source 112 are not expected to cross paths ("No" at block 622), then control passes to block 628, at which control circuitry 214 sets a low priority level for the alert. From block 624, 626, or 628, process 314 terminates.

If control is passed from block 602 to block 608, then at block 608 control circuitry 214 compares the speed of movement of speaker device 104 (or the speed of movement of the listener, e.g., as determined at block 522 of FIG. 5) to the speed of movement of alert source 112 (e.g., as determined at block 526 of FIG. 5), to ascertain whether speaker device 104 and alert source 112 are expected to cross paths or become near one another and, if so, in what time frame. The determination at block 608 may be performed, in various examples, in a manner similar to that described above for block 606. From block 608, control passes to block 622 to set priority level for the alert in the manner described above.

If control is passed from block 602 to block 610, then at block 610 control circuitry 214 uses signal processing to extract a vocal characteristic from the captured external audio content (e.g., including speech in this example), in the manner described above in connection with block 530 (FIG. 5), for instance, to ascertain whether the speech falls within a loudness range and/or whether the speech includes a repeated utterance of text (e.g., if a parent is repeatedly calling their child's name). In some examples, control circuitry 214 stores as part of priority level database 222 in storage 216 a predetermined mapping of loudness ranges and corresponding priority levels. For example, control circuitry 214 may store in storage 216 (1) a medium priority loudness range (e.g., a relatively quiet loudness range) that corresponds to a medium priority level for alerts, and (2) a high priority loudness range (e.g., a relatively loud loudness range) that corresponds to a high priority level for alerts. If control circuitry 214 determines that the captured speech falls within the high priority loudness range and/or that text is repeated ("Voice Exceeds Loudness Threshold and/or Text is Repeated" at block 630), then control passes to block 632, at which control circuitry 214 sets a high priority for the alert. If control circuitry 214 determines that the captured speech falls within the low priority loudness range and/or that text is not repeated ("Voice Below Loudness Threshold and/or Text is Not Repeated" at block 630), then control passes to block 634, at which control circuitry 214 sets a medium priority for the alert. From block 632 or 634, process 314 terminates.

If control passed from block 602 to block 612, then at block 612 control circuitry 214 sets the priority level at the priority level retrieved at block 532 (FIG. 5) for the alert based on the priority level table 222. The process 314 then terminates.

Figure 7:
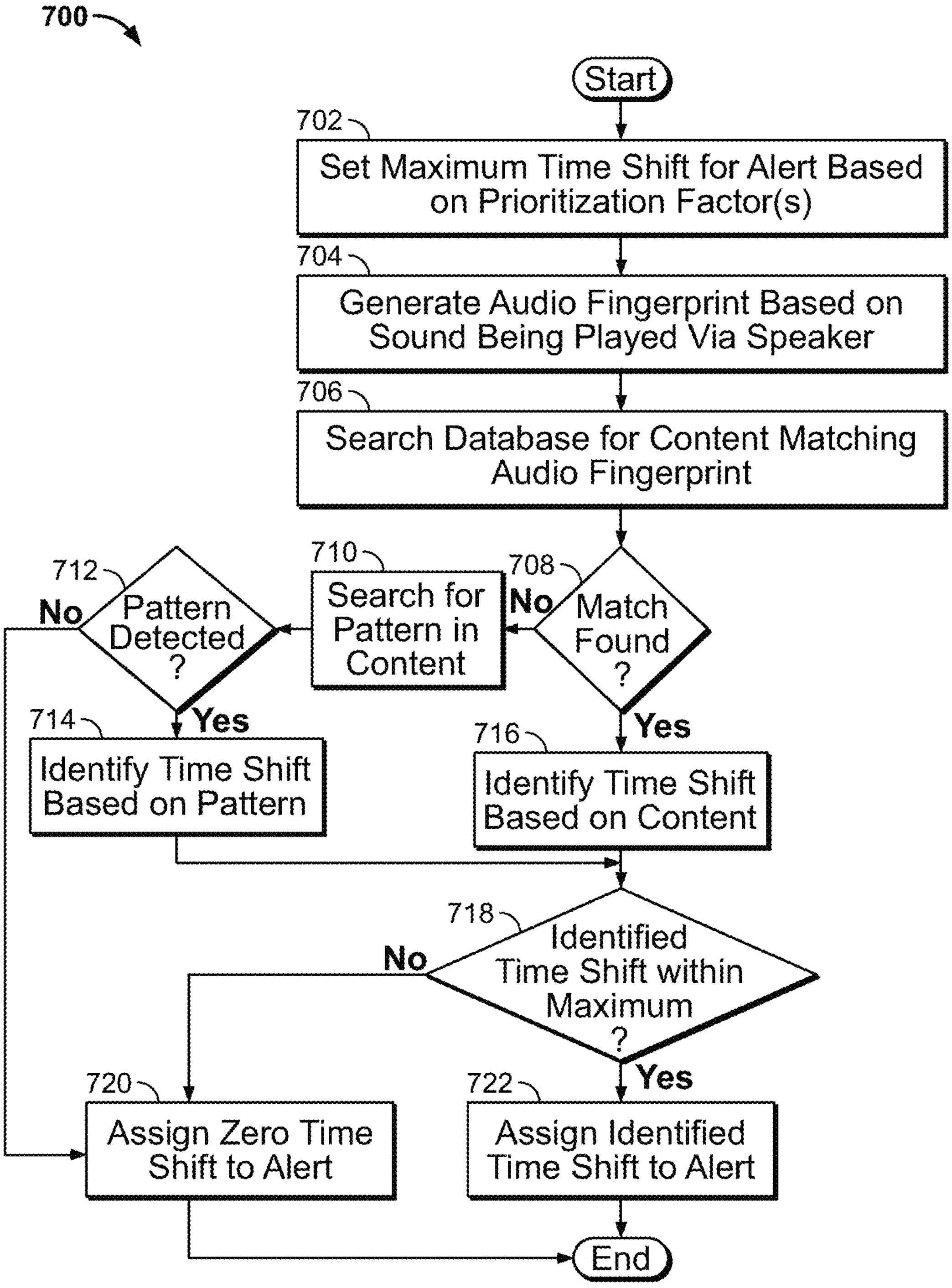
FIG. 7 shows a flowchart of an example process for determining time shifts for alerts, in accordance with some embodiments.

FIG. 7 shows a flowchart of example process 700 for determining time shifts for alerts, for example, to be used at block 320 and/or block 322 of FIG. 3, in accordance with some embodiments. At block 702, control circuitry 214 sets a maximum time shift for the alert based on the prioritization factor(s) obtained at block 312 and/or based on the priority level set for the alert at block 314 (FIG. 3). For example, control circuitry 214 may determine that no time shift is permitted for high priority alerts. As another example, control circuitry 214 may determine that low priority alerts are permitted to have a time shift of any value, without limitation. Additionally or alternatively, control circuitry 214 may set the maximum time shift at block 702 based on a time frame within which the locations of the speaker device 104 and the alert source 112 are expected to overlap (e.g., as determined at block 622 of FIG. 6)

At block 704, control circuitry 214 generates an audio fingerprint based on the music or other audio content currently being played through speaker 228. At block 706, based on the audio fingerprint generated at block 704, control circuitry 214 searches content database 226 to identify an item of audio content (e.g., a song, a podcast, an audiobook, and/or another type of media asset) of which the captured music or other currently played audio content forms a portion. If control circuitry 214 identifies an item of audio content that matches the currently played audio content ("Yes" at block 708), then control passes to block 716, at which control circuitry 214 identifies a time shift based on the identified item of content. For example, control circuitry 214 may use known sound processing techniques to identify upcoming quiet portions in a song currently being played to which to shift audio alerts to minimize interference with the song. If control circuitry 214 does not identify an item of audio content that matches the currently played audio content ("No" at block 708), then control passes to block 710.

At block 710, control circuitry 214 uses known audio processing techniques to search for a pattern within the audio content currently being played. For example, if the audio content is a podcast or other type of content with frequent lulls in volume (e.g., in between sentences), then control circuitry 214 may detect that pattern at block 710 so as to predict when upcoming quiet portions are expected to occur in the played content within which to audibly reproduce alerts. If control circuitry 214 identifies a pattern in the currently played audio content ("Yes" at block 712), then control passes to block 714, at which control circuitry 214 identifies the time shift for the alert based on the identified pattern. If, on the other hand, control circuitry 214 does not identify a pattern in the currently played audio content ("No" at block 712), then control passes to block 720, at which control circuitry 214 sets a time shift of zero for the alert. From block 720, process 700 terminates.

From block 714 or block 716, control passes to block 718. At block 718, control circuitry 214 compares the time shift identified at block 714 or block 716, as the case may be, to the maximum time shift set at block 702, if any, to determine whether the identified time shift falls within the maximum time shift. If control circuitry 214 determines that the identified time shift falls within the maximum time shift ("Yes" at block 718), then control passes to block 722, at which control circuitry 214 assigns the identified time shift to the alert. If control circuitry 214 determines that the identified time shift exceeds the maximum time shift ("No" at block 718), then control passes to block 720, at which control circuitry 214 sets a time shift of zero for the alert. Process 700 terminates after block 720 or block 722.

Figure 8:
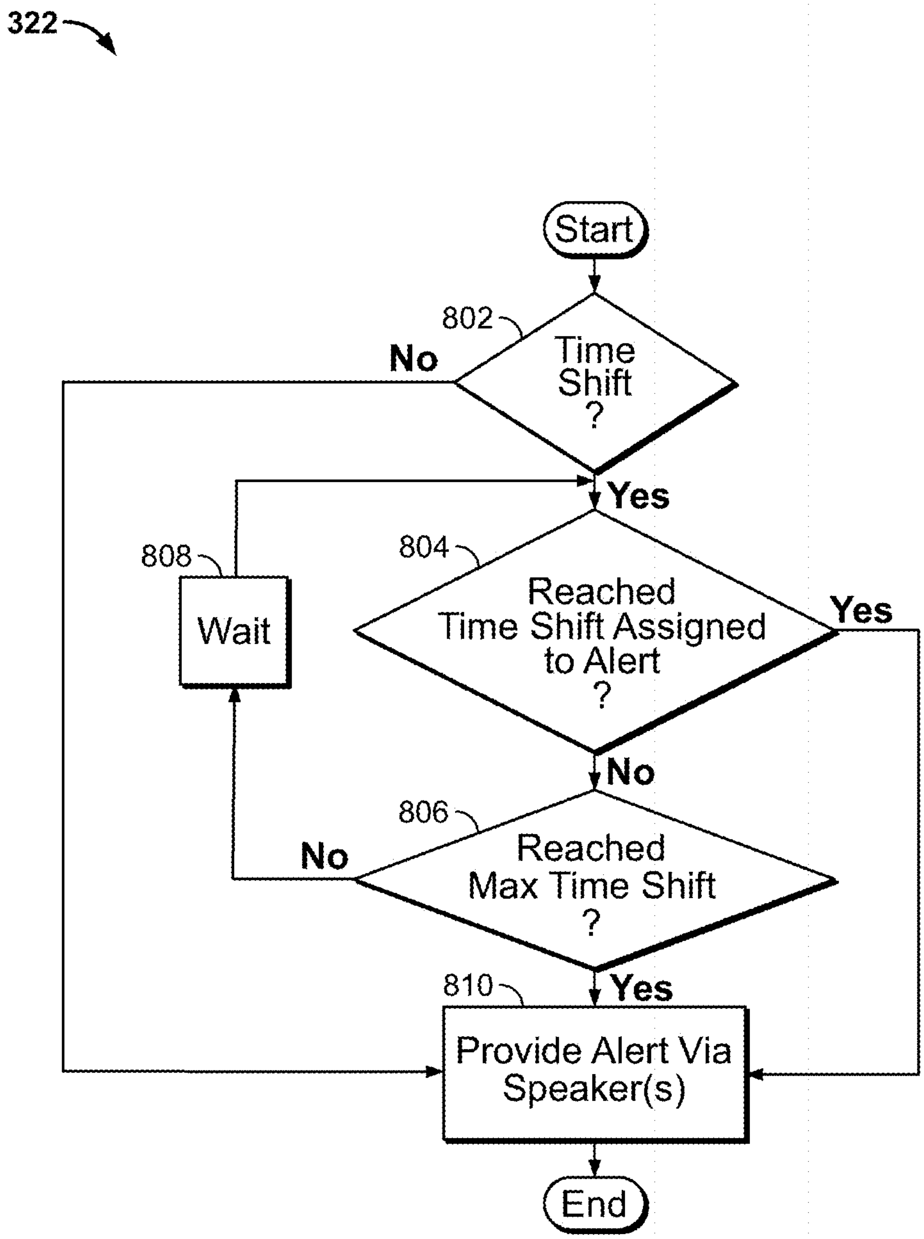
FIG. 8 is a flowchart of an illustrative process for audibly reproducing alerts, in accordance with some embodiments of the disclosure.

FIG. 8 is a flowchart showing an example of how control circuitry 214 may audibly reproduce alerts at block 322 of FIG. 3, in accordance with some embodiments of the disclosure. At block 802, control circuitry 214 determines whether any time shift has been set for the alert (e.g., according to process 700 of FIG. 7). If control circuitry 214 determines that no time shift has been set for the alert ("No" at block 802), then control passes to block 810, at which control circuitry 214 audibly reproduces the alert via speaker 228 without any added time shift. In some aspects, control circuitry 214 may employ techniques to achieve proper left/right balance, doppler effects, and/or the like to ensure the audible reproduction of the alerts at block 810 sounds real to a listener. Additionally or alternatively, control circuitry 214 may mark the audible alerts, for example, with an alert tone before providing the alert, so the listener is aware that an alert is forthcoming.

If control circuitry 214 determines that a time shift has been set for the alert ("Yes" at block 802), then control passes to block 804. At block 804, control circuitry 214 uses clock/counter 234 to determine whether the time shift or delay period has elapsed in the playing of the currently played content. If control circuitry 214 determines that the time shift has elapsed ("Yes" at block 804), then control passes to block 810, at which control circuitry 214 causes the alert to be audibly reproduced via speaker 228. If, on the other hand, control circuitry 214 determines that the time shift has not yet elapsed ("No" at block 804), then control passes to block 806, at which control circuitry 214 determines whether the maximum time shift (e.g., as set at block 702 of FIG. 7) has elapsed since capture of the alert. If control circuitry 214 determines that the maximum time shift has elapsed since capture of the alert ("Yes" at block 806), then control passes to block 810, at which control circuitry 214 causes the alert to be audibly reproduced via speaker 228. If control circuitry 214 determines that the maximum time shift has not yet elapsed since capture of the alert ("No" at block 806), then control passes to block 808, at which control circuitry 214 waits for a period of time (e.g., a predetermined period of time) before passing control back to block 804 to repeat the determination of whether the time shift or delay period has elapsed, as described above.

The processes discussed above are intended to be illustrative and not limiting. One skilled in the art would appreciate that the actions of the processes discussed herein may be omitted, modified, combined, and/or rearranged, and any additional actions may be performed without departing from the scope of the invention. More generally, the above disclosure is meant to be exemplary and not limiting. Only the claims that follow are meant to set bounds as to what the present disclosure includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A system for providing a listener audio environment via a speaker device, comprising:
- the speaker device;
- control circuitry configured to:
  - at least partially acoustically isolate the listener audio environment from the external audio environment;
  - receive first audio content at the speaker device;
  - determine a time shift for an alert from the external audio environment, wherein the alert comprises one or more sounds from the external audio environment that can be reproduced at the speaker device; and
  - generate the listener audio environment by playing the first audio content and sounds from the external audio environment, at a time based on the time shift, through one or more speakers of the speaker device.

2. The system of claim 1, wherein the control circuitry is configured to receive, via one or more microphones, audio content from the external audio environment.

3. The system of claim 1, wherein the control circuitry is further configured to:
- generate an audio fingerprint based on the one or more sounds from the external audio environment; and
- identify the alert based on the generated audio fingerprint.

4. The system of claim 1, wherein the control circuitry is further configured to determine that the external audio environment comprises the alert by generating an audio fingerprint based on the one or more sounds from the external audio environment and using the audio fingerprint to determine the alert.

5. The system of claim 1, wherein the control circuitry is further configured to:
- determine a priority level of the alert; and
- in response to the determining, based on the priority level, that the alert should be reproduced, audibly reproduce the alert via the one or more speakers with the first audio content.

6. The system of claim 5, wherein the control circuitry is further configured to:
- determine, based on a location of a source of the alert and a location of the speaker device, a distance between the alert source and the speaker device,
- wherein the determining the priority level is further based on the distance.

7. The system of claim 1, wherein the control circuitry is configured to at least partially acoustically isolate the listener audio environment from the external audio environment by suppressing output of the external audio environment through the speaker by using noise cancellation.

8. System of claim 1, wherein the control circuitry is further configured to determine that the external audio environment comprises the alert by:
- determining, at a computing device within the external audio environment and separate from the speaker device, that the external audio environment comprises the alert;

transmitting, from the computing device to the speaker device, an indication; and generating the listener audio environment in response to the receiving the indication.

9. A method for providing a listener audio environment via a speaker device, comprising:

at least partially acoustically isolating the listener audio environment from an external audio environment;

receiving first audio content at the speaker device;

determining a time shift for an alert from the external audio environment, wherein the alert comprises one or more sounds from the external audio environment that can be reproduced at the speaker device; and generating the listener audio environment by playing the first audio content and sounds from the external audio environment, at a time based on the time shift, through one or more speakers of the speaker device.

10. The method of claim 9, further comprising receiving, at one or more microphones, audio content from the external audio environment.

11. The method of claim 9, further comprising:

generating an audio fingerprint based on the one or more sounds from the external audio environment; and identifying the alert based on the generated audio fingerprint.

12. The method of claim 9, wherein the determining that the external audio environment comprises the alert comprises generating an audio fingerprint based on the one or more sounds from the external audio environment and using the audio fingerprint to determine the alert.

13. The method of claim 9, further comprising:

determining a priority level of the alert; and in response to the determining, based on the priority level, that the alert should be reproduced, audibly reproducing the alert via the one or more speakers with the first audio content.

14. The method of claim 13, further comprising:

determining, based on a location of a source of the alert and a location of the speaker device, a distance between the alert source and the speaker device, wherein the determining the priority level is further based on the distance.

15. The method of claim 9, wherein at least partially acoustically isolating the listener audio environment from the external audio environment comprises suppressing output of the external audio environment through the speaker by using noise cancellation.

16. The method of claim 9, wherein:

determining that the external audio environment comprises the alert comprises:

determining, at a computing device within the external audio environment and separate from the speaker device, that the external audio environment comprises the alert;

transmitting, from the computing device to the speaker device, an indication; and generating the listener audio environment in response to the receiving the indication.

17. A method for providing a listener audio environment via a speaker device, comprising:

at least partially acoustically isolating the listener audio environment from an external audio environment;

receiving first audio content at the speaker device;

determining that the external audio environment comprises an alert comprising one or more sounds from the external audio environment that can be reproduced at the one or more speakers;

determining, based on a location of a source of the alert and a location of the speaker device, a distance between the alert source and the speaker device, determining a priority level of the alert based on the distance;

in response to the determining, based on the priority level, that the alert should be reproduced, audibly reproducing the alert via one or more speakers of the speaker device with the first audio content.

18. The method of claim 17, wherein:

determining that the external audio environment comprises the alert comprises:

determining, at a computing device within the external audio environment and separate from the speaker device, that the external audio environment comprises the alert;

transmitting, from the computing device to the speaker device, an indication; and generating the listener audio environment in response to the receiving the indication.

* * * * *